United States Patent
Bostock (10) Patent No.: US 9,116,901 B2
(45) Date of Patent: Aug. 25, 2015

(54) DATABASE SNAPSHOT ANALYSIS

(71) Applicant: ORACLE INTERNATIONAL CORPORATION, Redwood Shores, CA (US)

(72) Inventor: Clive Bostock, Pickering (GB)

(73) Assignee: Oracle International Corporation, Redwood Shores, CA (US)

( * ) Notice: Subject to any disclaimer, the term of this patent is extended or adjusted under 35 U.S.C. 154(b) by 178 days.

(21) Appl. No.: 13/971,530

(22) Filed: Aug. 20, 2013

(65) Prior Publication Data

US 2014/0351217 A1 Nov. 27, 2014

Related U.S. Application Data

(60) Provisional application No. 61/826,763, filed on May 23, 2013.

(51) Int. Cl.
G06F 17/00 (2006.01)
G06F 17/30 (2006.01)

(52) U.S. Cl.
CPC .................. *G06F 17/30088* (2013.01)

(58) Field of Classification Search
CPC .......................................... G06F 17/30
USPC .................................. 707/600–899
See application file for complete search history.

(56) References Cited

U.S. PATENT DOCUMENTS 6,829,617 B2 * 12/2004 Sawdon et al. ...................... 1/1
7,756,831 B1 * 7/2010 Rao ................................. 707/638

* cited by examiner

*Primary Examiner* — Isaac M Woo
(74) *Attorney, Agent, or Firm* — Kilpatrick Townsend & Stockton LLP (57) ABSTRACT

Analysis tools summarize and provide statistics from snapshot files. The analysis tools may provide a temporal view of the changes of the data values across two or more periods of time from one or more snapshot files to show trends in performance of the system. The analysis tools may include meta-data definitions for different sources of the snapshot information.

20 Claims, 7 Drawing Sheets

DATABASE SNAPSHOT ANALYSIS

CROSS-REFERENCES TO RELATED APPLICATIONS

This application claims priority U.S. Provisional Application Ser. No. 61/826,763, filed May 23, 2013, entitled "DATABASE SNAPSHOT ANALYSIS," the contents of which are incorporated by reference herein in its entirety for all purposes.

BACKGROUND

The present invention generally relates to databases and more specifically to apparatus and methods for providing a database system analysis tools.

Modern database systems are very complex, comprised of numerous components and often are used for performance-sensitive operations. Diagnosing problems and evaluating a system's performance may therefore be a very involved and complicated task as there are potentially many performance and analysis metrics. As a result, a database system administrator may desire to use summary statistics to view and analyze one or more performance and analysis metrics at the same time.

Determining system statistics to diagnose system problems or to evaluate a performance may require manual analysis of log files or intrusive analysis tools that may compromise the database security or performance. Existing mechanisms to collect system data statistics may require access to privileged database information. System log files and existing analysis tools may inadvertently capture sensitive or confidential system data or require database privileges that are not appropriate for some system administrators or contractors. Furthermore system statistics may need to be collected from a variety of sources within the system. Each data source may have its own format and data layout making it difficult and cumbersome to collect and capture data.

SUMMARY

In embodiments, a system for providing statistic data for a database is provided. The system includes one or more processors and a non-transitory computer readable medium coupled to the processor and storing a plurality of instructions. The system may be operable to collect and store snapshot information according to a schedule wherein the snapshot information comprises data relating to the state of the database at the time of the snapshot information collection. The system may be further operable to define a time period of analysis of the snapshot information and at least one analysis data of the snapshot information to capture for analysis. The system may be operable to determine and load necessary meta-data definitions for the defined at least one analysis data and snapshot information and parse and collect the at least one defined analysis data from the snapshot information. The system may be operable to compute statistics over the time period of analysis for at least one defined analysis data of the snapshot information, to format the computed statistics, and to output the computed statistics. In embodiments only the computed statistics may be outputted no direct snapshot information may be accessible.

In other embodiments a method for providing statistic data for a database is provided. The method may include collecting snapshot information according to a schedule, wherein the snapshot information comprises data relating to the state of the database at the time of the snapshot information collection, defining a time period of analysis of the snapshot information, and defining at least one analysis data of the snapshot information to capture for analysis. The method may further include the steps of determining a meta-data definition, wherein the meta-data definition define the data structure and organization of the snapshot information. The method may also include collecting a data field from the snapshot information, computing statistics over the time period of the data filed, and formatting the computed statistics to output to a user.

In other embodiments a computer program product residing on a non-transitory processor-readable medium and comprising process readable instructions is provided. The instructions may be configured to cause a processor to collect and store snapshot information according to a schedule, wherein the snapshot information comprises data relating to the state of the database at the time of the snapshot information collection. The instructions may define a time period of analysis of the snapshot information, define a data field of the snapshot information to capture for analysis, and determine meta-data definitions, the meta-data definitions defining the data structure and organization of the snapshot information and the data field. In addition, the instruction may further cause a processor to load the meta-data definitions, collect the data field from the snapshot information, and compute statistics over the time period of analysis for the data field. The instructions may also format the computed statistics and output the computed statistics.

BRIEF DESCRIPTION OF THE DRAWINGS

A further understanding of the nature and advantages of various embodiments may be realized by reference to the following figures.

DETAILED DESCRIPTION

Historical database system data may be useful for diagnosing system problems or analyzing system performance. Database system data may be captured in a series of "snapshots" and may be stored in a snapshot repository. The snapshot repository of the system may contain enormous amounts of data regarding many aspects of the database performance, use, access characteristics, and/or the like.

The data may be difficult to analyze and interpret by a user such as the database administrator (DBA). Each snapshot of the system data may provide a limited view of the database system at a specific time. To determine if there was a problem or to analyze the performance of the system a user may need to browse through a large number of data snapshots, data files, log files, and/or the like. To obtain the system's performance and diagnostic information over a period of time a user may need to analyze and compare many different data snapshots or run intensive analysis tools that may disrupt the normal activity or affect the performance of the system.

To further complicate the analysis, snapshot information may be generated by different parts of the system. Snapshot information may be captured in different formats or may contain different data depending on which part of the system generated the snapshot, the version of the database software, and the like. It is to be understood that the term snapshot may be used to collectively refer to any number of system log files, system diagnostic files, performance reports, activity reports, system state data dumps, and the like. In one aspect snapshot data may be a collection of persistent system performance files such as an automatic workload repository (AWR). In some systems a single snapshot may correspond to a collection of system and database data at a specific time instant or time range. Snapshot information may be a collection of snapshots corresponding to various time instants or time ranges.

Accordingly, the present disclosure provides, in one aspect, analysis tools to summarize and provide statistics from snapshot information to a user. The analysis tools may provide a temporal view of the changes of the data values across two or more snapshot points from one or more snapshot files to show trends in performance of the system. The analysis tools may collect, compute, normalize, and/or the specific values or data points of the snapshot information. In embodiments the analysis tools may take a collection of text based snapshot or report data and uses meta-data entries stored in a meta-data directory to determine how to extract sections of data from each of the snapshot files and produce comma separated values (CSV) files for use with a spreadsheet application, other analysis tools, and the like.

The analysis tools may be extensible and customizable to different formats or types of snapshot information. The analysis tools may include meta-data definitions for different sources, formats, types, version, and the like of the snapshot information. The meta-data definitions may include information regarding the type of data in each snapshot, the format, layout, and/or the like. The analysis tool may be configured such that the tool may be updated for each new snapshot information format by updating or providing a new meta-data definition. Compatibility between the tool and new formats of snapshot information may be established by providing appropriate meta-data definitions for the layout, format, data fields, and the like associated with each snapshot type.

In yet another aspect, the analysis tool may be low weight as to be easily portable between systems and/or have a low impact on system performance or activity when it is active collecting or computing analyses. In embodiments the analysis tool may be a low weight tool meaning that the tool's image or storage requirements on a system when the tool is not active is less than 20 MB. The tool may leverage a system's built in script engines, interpreters, code libraries, and the like. Leveraging the code base and functions already present on the system may reduce the code and functions that need to be packaged into the analysis tools. In embodiments the analysis too may be a low weight tool meaning that the tool's memory footprint and/or processing requirements are constrained. The analysis tool may be configured to reduce or constrain the impact on a database performance or normal activity by ensuring that the tool does not use too much of the computer system's resources when it is active. The tool may be configured to use no more than 20% or not more than 40% of a computer system's unused processor or memory resources. The tool may be configured to run in low priority and use less of the system's resources during high load periods of periods of high database activity.

In another aspect the analysis tools may provide data security to the snapshot information. Snapshot information may in some cases contain confidential information regarding database activity, access statistics, and the like. The analysis tool may provide a function for stripping, normalizing, scrambling, or obscuring sensitive information from the analysis report to show trends and not actual values.

Figure 1A:
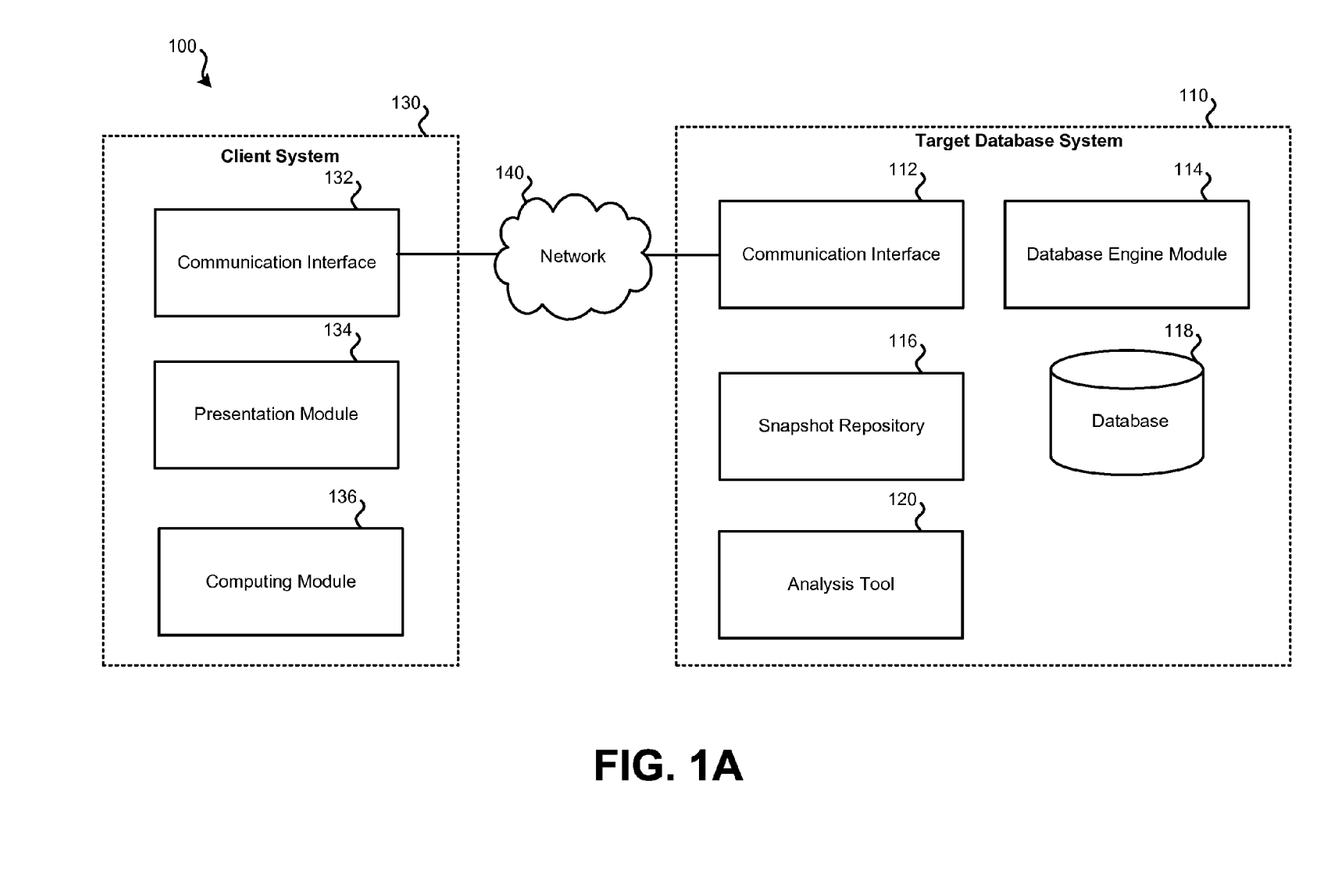
FIG. 1A illustrates a block diagram of an embodiment with the analysis tool local to the database system.

FIG. 1A depicts a system 100 of a database with an analysis capability according to an embodiment of the present invention. System 100 includes a client system 130 and a target database system 110. The target database system 110 includes a database module 118 and a database engine module 114. Database engine module 114 is configured to receive and process requests for a database module 118. The database module 118 and the database engine module 114 may be one of a variety of database engines and databases and a person skilled in the art will appreciate the various components of a database engine module 114 and the database module 118.

The snapshot repository 116 may be configured to capture snapshot information from any parts of the database system including the database module 118 and/or the database engine module 114. The snapshot repository is, in one aspect, a collection of persistent system data. The snapshot repository may maintain and/or create a schedule of snapshot capture times at which the system will automatically capture statistics that reflect the activities of the system up to the capture time. In one embodiment, the capturing period is set to a default time interval, such as 1 second, 1 minute, or 60 minutes or more or anytime in between. In another embodiment the snapshot collection process is preferably synchronized with database system activity and may be captured at irregular intervals. The snapshot capture may be configured to occur at periods of high system activity or when large changes in system activity are observed for example. In embodiments snapshots and snapshot repository may include periodic dumps of system state data, log files, system reports, repository data, access statistics, and the like.

Some database systems may have one or more snapshot repositories. Each snapshot repository may be specific to a particular part of the system. For example there may be a separate repository for data related to CPU, memory access, and operating system performance and a separate repository for database related data such as access times, request queue times, and the like. In embodiments the snapshot repositories may be stored locally or at a remote computer, network storage device, cloud, and the like.

The snapshot repository may be organized as a collection of files, data dumps, text files, binary files, flat files, database records, XML files, and the like. Those skilled in the art will appreciate that there is a variety of ways data may be stored and organized in a system. In embodiments each snapshot may be a separate file while is other embodiments two or more snapshots may be combined together. Snapshots may be continually appended to one file. To make room for capturing new snapshots, old snapshots may be purged. The snapshots may be purged automatically or in response to a DBA's request. In one aspect, snapshots are removed automatically based on chronological order. In some embodiments, when a snapshot is identified to be removed the analysis tool may be run automatically on the data with a default analysis or default mode to capture summary statistics about the set of snapshots.

The snapshot information may be analyzed, summarized, reported, and/or the like by the analysis tool 120. The analysis tool 120 may be a script, executable batch program, an interactive program, or the like that runs on the database system and provides statistics, reports, summaries, and/or the like about the data in the snapshot repository 116. The analysis output of the analysis tool 120 may be stored in a location on the database system or transmitted to a client system via the communication interface 112 and network 140. A client system 130 may receive the analysis via its communication interface 132. The analysis output of the analysis tool 120 may be presented to user using a presentation module 134. In embodiments the analysis output may be transmitted to a third party and accessed by the client system 130 via the network 140. The third party may be a cloud storage service or the like.

Figure 1B:
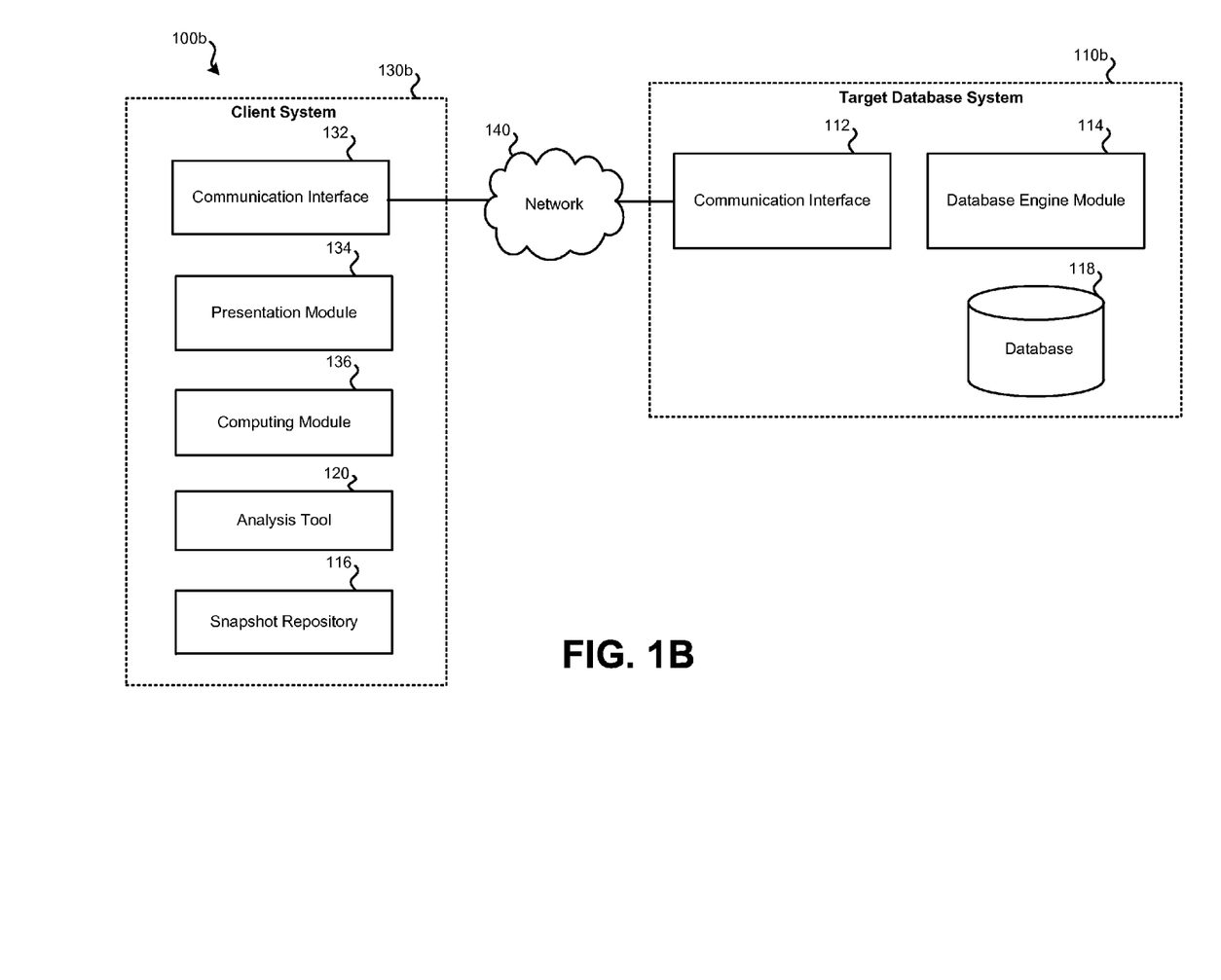
FIG. 1B illustrates a block diagram of an embodiment with the analysis tool remote from the database system.

In some embodiments the analysis tool may be a script, executable, a program, and the like that is located and executes on a client system. The analysis tool may access the snapshot information of the snapshot repository through a network and calculate or gather statistics from the snapshot repository from the target database system. FIG. 1B depicts an alternative configuration of a system 100b according to another embodiment of the present invention. System 100b includes a client system 130b and a target database system 110b. The snapshot repository 116 and the analysis tool 120 may be located local to the client system 130b. The snapshot repository 116 may be configured to capture snapshot information from the target database system. Snapshot information about the target database system 110b may be transmitted to the snapshot repository 116 at the client system 130b through the network 140. The analysis tool 120 may calculate or gather statistics from the snapshot repository 116 on the client system 130b.

In other embodiments the location of the analysis tool 120 and snapshot repository 116 modules may be arranged in different configurations. As depicted in FIG. 1A, for example, both modules, 120 and 116 may be local to the target database system 110. In other embodiments, as depicted in FIG. 1B the modules 120 and 116 may be local to the client system 130b. The location of the modules may depend on system element characteristics such as the storage/computing capabilities or the performance requirements of the client or target database systems. For example, in embodiments, the analysis tool and the snapshot repository may be located on the client system in order to reduce the impact on system performance of the target database system. Performing analysis on a remote server may reduce the impact on the computing resources of the target database system.

Figure 2:
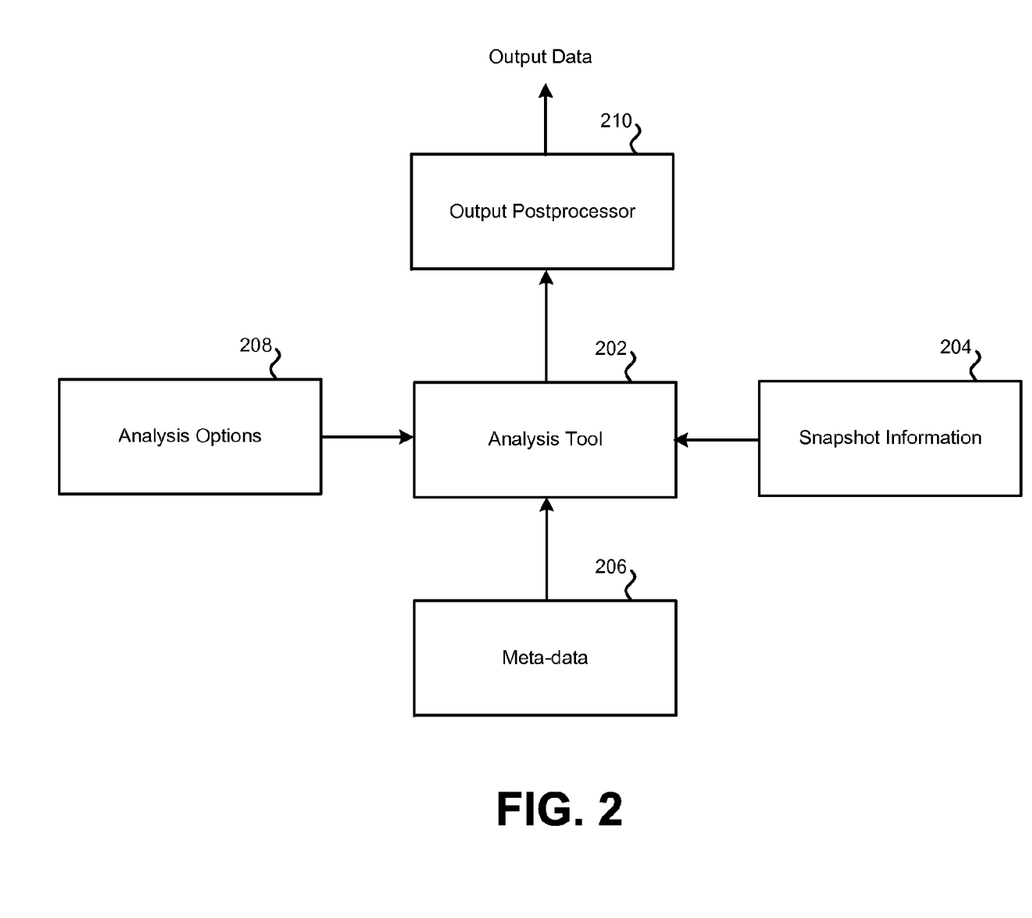
FIG. 2 illustrates a block diagram of inputs and outputs of an analysis tool.

FIG. 2 shows a diagram of the inputs and output associated with the analysis tool. In embodiments the analysis tool 202 takes as input snapshot information 204 from the snapshot repository. The analysis tool has an additional meta-data input that provides definitions for the snapshot information 204. The meta-data may define the format of the snapshot information, how the data or organized, how to read the data, the units of the data, and the like. The meta-data may be unique for each system. The meta-data may have a number of definitions of various snapshot repositories and database system. The analysis tool may parse the meta-data file to find entries for the particular system and snapshot information the tool is trying access. Thus the analysis tool may be universal or defined to work on a variety of systems and snapshot repositories. In embodiments the analysis tool may read a system schema meta-data and determine the possible sources of snapshot information on the system.

The analysis tool may further include user input for analysis options 208. The analysis options may be used to define the type of analysis the analysis tool 202 should perform on the snapshot information 204. The analysis options may define the time period of interest and the data to analyze. The analysis options may define how the data should be processed, if it should be compared relative to other data, and the like. In embodiments the analysis options 208 may be defined and read by the analysis through a text file, terminal input, graphical interface, and the like.

The analysis tool takes as input the meta-data definitions, snapshot information, and analysis options and performs the analysis. The analysis may involve performing computations. Analysis computations may include computing a delta or a change in values for data fields in different snapshots. Analysis may include the summation or averaging of values of different snapshots. In embodiments the computations may include computing correlations between any number of data fields or snapshot files. Statistical information such as deviations, regression analysis, multivariate analysis, and the like may be computed on the data fields of the snapshot information.

The analysis tool 202 may output statistics data in a verity of formats. The analysis tool may have an extensible output post processor 210 to allow conversion of the statistical data to a number of formats that may be manipulated or analyzed using other tools or software. The output of the analysis tool may preferably be formatted such that data trends, graphs, data histories, and the like may be readily charted or plotted. The analysis tool may have options for an output that is a comma separated file, spreadsheet file, and the like. In embodiments the output post processor 210 may be integrated or may be part of the analysis tool 202. Post processing options of the output postprocessor may be defined by the analysis option 208 or by the meta-data 206 definitions for each system.

In embodiments, when the analysis tool is executed it may be configured to build a list of relational database management system (RDBMS) versions based on the snapshot information files it is presented with. From this list it may determines which meta-data definitions and files are applicable to the system. The tool may then apply the related meta-data files to the applicable snapshot files. This feature of the analysis tool provides extensibility without the need to change program code. The analysis tool is adaptable to different database version, snapshot formats, systems, and the like. The definitions of the data do not need to be hard-wired into the tool. Hard wired definitions may require modification to the code of the tool when updates affecting the snapshot format occur. Configuring the tool to build a list of RDBMS versions based on the snapshot data that is presented to the tool allows the tool to be configured to new data format definitions by changing the meta-data definitions for each new format or version. The code of the tool does not have to be modified.

In embodiments, the meta-data records may be used to define or configure the analysis tool to locate specific parts, data fields, location, or the like within the snapshot information files. The meta-data definitions, for example, may enable the analysis tool to locate specific data fields by defining regular expression definitions for the start of the data field. In embodiments the meta-data definitions may include both "start regular expression" and "end regular expression" fields. These may be used by the analysis tool to "snip" out a section (range of lines) from each snapshot. In embodiments the analysis tool may stop returning lines to the snipped report section as soon as it finds the first match to the provided "end regular expression".

In embodiments, in addition to a "start regular expression" and "end regular expression" a meta-file may include additional definitions which define the labeling of the output data. The meta-data may be used to define from where the data labels, report labels, time labels, and the like associated with the extracted data may be found.

In embodiments, the meta-data records may be used to define or configure the analysis tool to locate specific parts, data fields, location, or the like within the snapshot files by defining column positions of data descriptors/labels and the corresponding data values which may be extracted from each snapshot. For snapshots for which the data may be arranged in a tabular format the meta-data may define starting column position and the length of the data element. The meta-data definitions may direct the analysis tool to quickly parse the snapshots to find the relevant data fields. Data may be extracted from the snapshot files by directly extracting data at the column positions directed by the meta-data.

In embodiments, the meta-data records may be used to define or configure the analysis tool to locate specific parts, data fields, location, or the like within the snapshot files by defining the field number of each element. Each non-whitespace sequence of characters in a snapshot file may be treated as a field. The first non-whitespace sequence of characters may be defined as field number 1, the second as field number 2, and so on. The metadata may define the field number of a specific field for analysis. The analysis tool may quickly extract the desired data by extracting the defined field number from the snapshot data.

The meta-data definitions allow code independent extensibility and makes the analysis tools independent of database versions, system versions, formats, and the like, since new meta-data files can be modified or added for new versions or formats.

In some embodiments the snapshot information may contain sensitive or private information. The snapshot information may in some cases contain confidential information regarding database activity, access statistics and the like. Database activity may reveal information regarding the demand for services, the time of activity, or other propriety data.

In embodiments, post-processing may include an option for removing confidential information from the statistical data. The stripping of confidential information may include normalizing the data and removing any units associated with the data. The time intervals may also be changed and replaced with a coded stamp such that it will not be possible to determine the time of the day, day of the week, and the like for at least one output of the analysis tool. For example, a series of data may be captured from snapshot information that shows the number of database access requests as a function of time. The number of access requests may provide some confidential information is reported to unauthorized users. To hide the information the data series of access requests may be normalized to the highest number in the series. The new series may be normalized (i.e. dividing by all values of a series by the highest value of the series) such that all the values in the series range between 0 and 1 or between 0 and 100. After normalization the data series may only shows trends and relative values thereby preventing the release of potentially sensitive information. Furthermore, the time stamps associated with the data series may also be changed or relabeled with generic labels such as "time 0", "time 1", etc. The relabeling may prevent an unauthorized user from determining which times of the day or the week were times of high activity. The relabeling of time labels may be performed in a coded manner or a consistent manner as to allow the system or an authorized user to determine the actual times associated with each label. Hash functions, one-way functions and the like may be used to re-label the time stamps. The initiation of the security postprocessor may depend on the privileges of the user running or initiating the analysis.

Security or privacy requirements for each data field in a snapshot may be defined by the meta-data. Meta-data may define location of the fields or data within each snapshot and the sensitivity or privacy of each label. Meta-data definitions may direct the analysis tool to prevent external access of the data, require processing, or stripping of data prior to transmitting to a remote server, for example. For some data fields, the meta-data may be used to limit the output of the analysis tool to only show an average, or a normalized trend of a data field without the actual values from the snapshot information.

Figure 3:
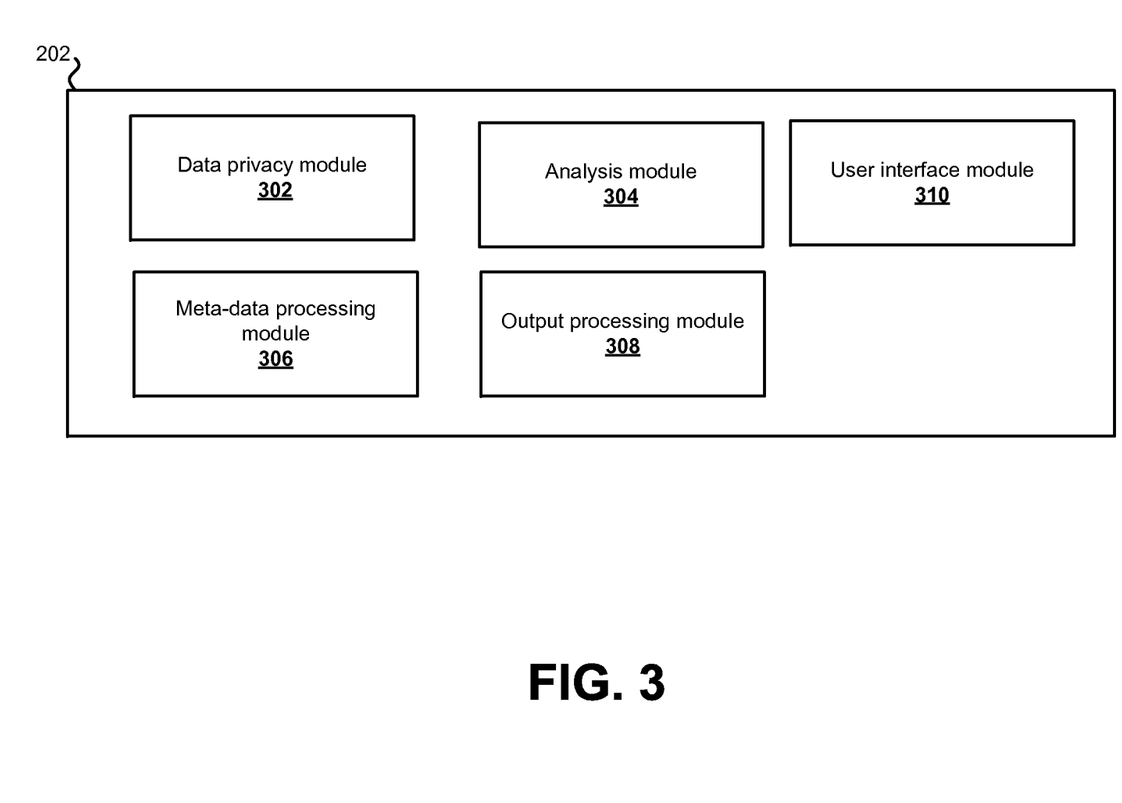
FIG. 3 illustrates a block diagram of the modules of an embodiment of an analysis tool.

FIG. 3 shows a block diagram of some components of an embodiment of the analysis tool 202. The analysis tool may include a meta-data processing module 306. The meta-data processing module 306 may provide the analysis tools with the ability to read meta-data definitions. The meta-data definitions may be used to define the structure of the snapshot information, data locations and formats of data fields that should be captured for analysis, data field privacy or security information, and/or the like. In embodiments the meta-data processing module 306 may scan or read the snapshot information files, snapshot header files, or parts of the snapshot files and determine the appropriate meta-data definitions for the snapshot information. In embodiments the meta-data processing module 306 may determine the appropriate meta-data definitions based on system data information, database software versions and the like. The analysis tool may further include an analysis module 304. The analysis tool may analyze the snapshot information to generate statistics, summaries, inferences, and the like from the snapshot information. The analysis module 304 may interface with the meta-data processing module 306 to receive definitions for the snapshot information and determine where to locate the data needed for analysis. The analysis module 304 may receive input from a user, from a file, or from other modules of the analysis tool that define the type of analysis to perform, what data to analyze, where to locate the data, the preferred output data format, and/or the like.

In embodiments the analysis module 304 may combine results from one or more concurrent or previous analyses. The analysis module may store or have access to a repository of previous analysis results spanning different dates of snapshot information, different analysis type, or different fields. The analysis module 304 may be configured to load other analysis and perform operations such as comparisons, concatenations, and the like. For example, the analysis tool may load the analysis results representative of the snapshot information from a prior week and compare the changes with the analysis that is being performed for the current week. The snapshot information may be deleted after a week and therefore obtaining a long term trends of data may not be available without a saved analysis. In embodiments the analysis module may be used for the sole purpose of modifying loading, concatenating, further analyzing, and the like of previous analyses without reading or loading any new snapshot information.

In embodiments, the analysis tool 202 may optionally include a data privacy module 302. The data privacy module 302 may be used to define, and enforce data privacy rules. The data privacy module 302 may be used to define what type of data from the snapshot information may be reported out of the tool 202. As discussed above, the snapshot information may include private or sensitive information which users may not want to release or make available with the analysis tool or may only want to release to specific users, groups, privileges, or the like. The data privacy module 302 may have a list, database, file, or the like of data privacy definitions and rules which determine the type of data is allowed to be analyzed by what user. In embodiments the data privacy module 302 may be configured to receive security policy information from the meta-data processing module. The security and privacy data may be embedded in the meta-data definitions. In some embodiments, the data privacy module may be used by the system as a firewall type device to the analysis tool 202. The data privacy module 302 may screen all analysis tool use for requests and/or output of private data. The tool may be configured to filter out requests and output of private data.

The output of the analysis module 304 shown in FIG. 3 may be further processed, formatted, exported, and the like by the output processing module 308. The output processing module 308 may be used to change the format of the output of the analysis module 304. The output processing module 308 may provide graphing, plotting, or other visual output modes that summarize the analysis. In embodiments the output processing module 308 may be used as an interface between the analysis tool 202 and other third-party tools, services, graphical engines, and the like. The output processing module may be configured to automatically convert analysis module output to a predefined format suitable for an external tool, service, and the like and may be configured to transmit data in a block format, streaming format, or may buffer the analysis output and provide data as requested by third-party tools, services, and/or the like. In embodiments, the output processing module 308 may be configured to operate with the data privacy module 302 and may help enforce security and privacy of data by filtering, normalizing, renaming, and the like the output data.

In embodiments the analysis tool 202 may also optionally include a user interface module 310 for displaying, manipulating, exporting, defining, and/or the like the analysis parameters and outputs. In embodiments the analysis tool may have a graphical engine and may be able to provide graphical tools for analysis and visualization of the data. The graphical user interface may be separate program that resides on the client system and communicates through the network with the analysis tool. The analysis tool may signal the graphical user interface to list the available data that is in the snapshot repository (what time intervals, what data was captured, and the like).

The functions of the various parts of the analysis tool 202 shown in FIG. 3 may be combined into fewer modules or divided in a greater number of modules. The various functions of the modules of the tool 202 may be combined into one module, hardware, code, or the like without departing from the spirit and structure of the analysis tool outlined herein. Likewise, in some embodiments the function of the each of the modules may be split across many different modules, hardware, code, and the like that are executed to perform one or more analysis tasks.

Figure 4:
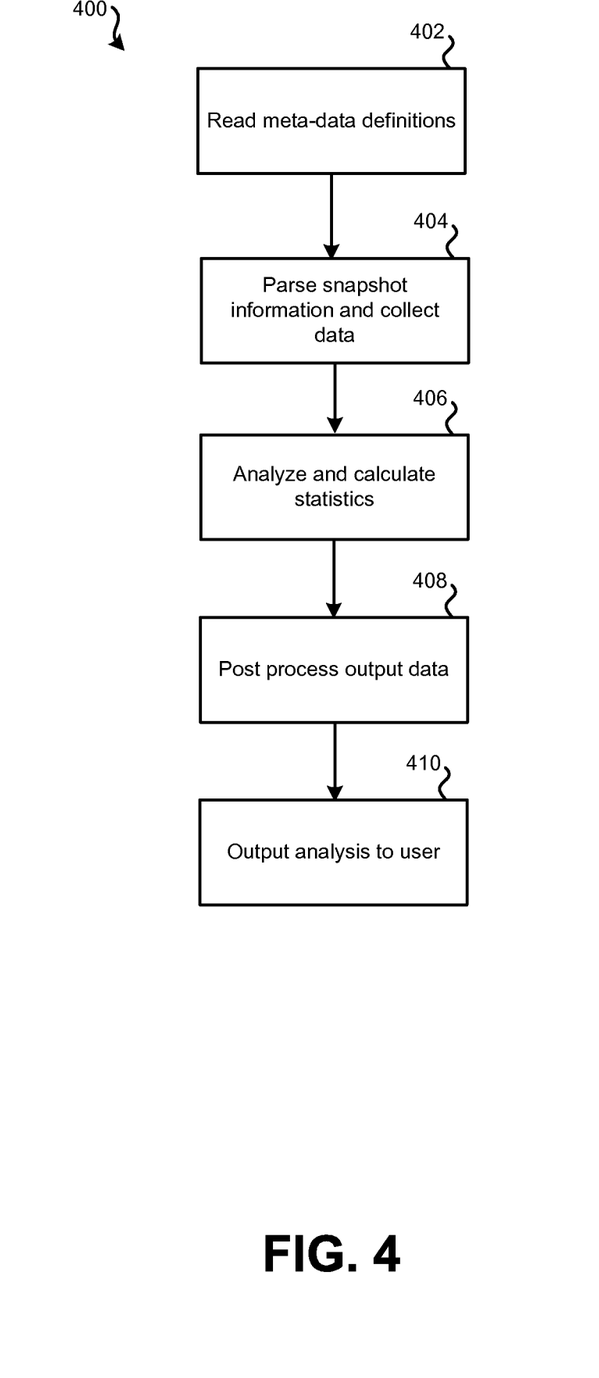
FIG. 4 illustrates one embodiment of a method for analyzing database performance.

Various methods may be performed using the system of FIG. 1 and/or the analysis tool shown in FIG. 2 and FIG. 3. FIG. 4 illustrates an embodiment of a method 400 for performing data analysis on snapshot information. Each step of method 400 may be performed using system 100 of FIG. 1 and/or the analysis tool 202 of FIG. 3. Each step of method 400 may be performed by a computer system. For example, computer system 600 of FIG. 6 may be used to perform each step of method 400. Accordingly, means for performing method 400 include one or more computer systems, networks, and/or one or more remote computer systems.

At step 402 of the method of FIG. 4, the analysis of the snapshot information may begin with reading of the meta-data definitions for the particular set of snapshot information and data fields considered for analysis. The meta-data definitions may be selected automatically from a repository, list, database, or the like of meta-data or may be manually specified by a user or system administrator. At step 404 the method includes parsing the snapshot information to collect data for analysis. Specific data fields or data segments of the snapshot information that are selected for analysis may be located with the use of the meta-data definitions. The meta-data definitions may be used by the tool to determine where the data is located, or how to find it by parsing the snapshot information files. At step 406 the collected data fields may be analyzed. The analysis may include any number or types of computations. Averages, trends, statistics, summaries, and the like may be computed for each data field analyzed. Multiple data fields from the snapshot information may be combined to produce relative analysis, multivariate analysis, and the like. At step 408 the analyzed data may be post processed. Post processing may include converting the data into a different data format, generating graphs or figures for graphical representation of the data, or exporting to another application, script, utility, or the like. At step 410 the analysis output may be available to the user. The output may be provided in one or more formats and may include output to a text file, CSV file, database, HTML, web page, graphical user interface, and the like.

Figure 5:
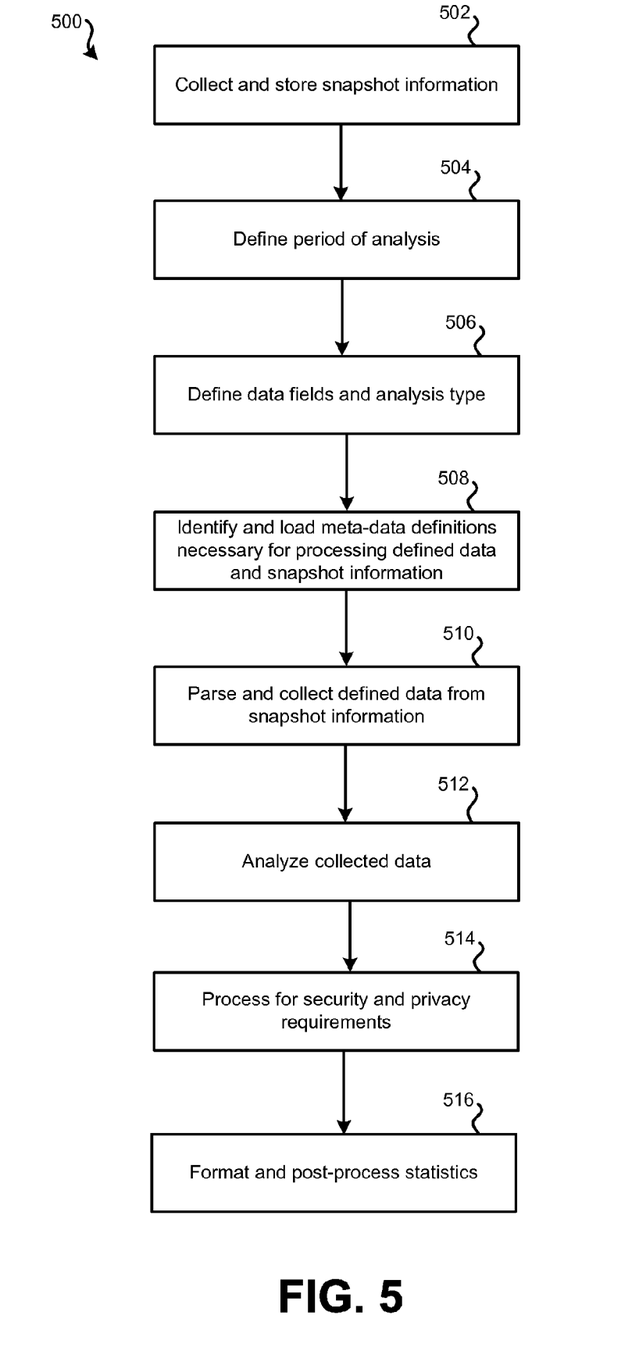
FIG. 5 illustrates another embodiment of a method for analyzing database performance.

FIG. 5 illustrates another embodiment of a method 500 for performing database performance and diagnostic analysis. Each step of method 500 may be performed using system 100 of FIG. 1 and/or the analysis tool 202 of FIG. 3. Each step of method 500 may be performed by a computer system. Accordingly, means for performing method 500 include one or more computer systems, networks, and/or a remote computer system. At step 502 of the method of FIG. 5, the database system may collect snapshot information. The snapshot information may be collected from various parts of the system like the database engine, the database, operating system, and the like. The data may be captured periodically according to a schedule or in response to user requests or specific triggers. The snapshot information may be accumulated over a span of time and stored in a repository on the system or on a remote data storage element. At step 504 the period of analysis may be defined. The analysis may be performed on only a subset of the snapshot information pertaining to snapshots which occurred during specific time intervals of interest. The period of analysis may be defined in terms of normal natural calendar time and typical hours. The period of analysis may be defined in terms of number of snapshots to analyze, i.e. the analysis may be performed on the twenty previous data snapshots. The date and time range of the snapshot information stored in the repository or available for analysis may be determined by the system and presented to a user or operator. The snapshot information files may be scanned or parsed to determine the range of dates or times of database activity they represent. At step 506 the data fields for analysis as well as the analysis type may be defined. The data fields may be any part of the snapshot information that will be used in the analysis. The data fields may be numerical, descriptive, logical, or the like. In some embodiments, the type of analysis performed may be defined per each data field. In other embodiments the type of analysis performed may be grouped and categorized. A choice of three or more different analysis types may be provided. The analysis types may be already defined with a default set of data fields and analysis types to perform. The snapshot information may be scanned or parsed to determine the data fields available for analysis. The list of data fields may be presented to a user or operator for selection via graphical user interface or other selection methods.

At 508 meta-data defining the structure of the snapshot information may be identified and defined. The meta-data definitions may describe the locations of the defined data fields within the snapshot information files. In some embodiments, the meta-data may define some aspects of the type of analysis to perform for each data field. The meta-data definitions may be unique to each system, analysis type, or snapshot repository. Using the meta-data definitions, at 510, the snapshot information is parsed and the data fields that were selected for analysis are collected from the snapshot information. At 510, the collected data may be temporarily stored or buffered until the data is processed for output. In some embodiments, the parsed data may be used to calculate functions of the data such as the sum, mean, and the like and may therefore not need to be buffered or temporarily stored as it is read. At the 512 the collected data may be analyzed. Various analysis functions on the collected data may be performed to extract statistical data, values, trends, or the like. In embodiments step 512 may be performed simultaneously with 510. As described above, for some analysis functions, such as computing the mean, the data may be analyzed as it is collected. If security or privacy requirements for the type of analysis or the collected data fields are defined, the analyzed data may be processed at 514 to ensure the requirements are meet. The analyzed output data may be scanned or analyzed to determine if any data fields that defined to be private may be determined or inferred from the output data. In embodiments, portions of the output data may be filtered, normalized, renamed, or the like to hide, remove, or obscure any information that may reveal private of sensitive information. At 516 the analysis output may subject to further processing to convert the output to a desired format, to generate plots, reports, or other summaries of the data.

In embodiments the analysis tool may generate additional outputs describing the output of the analysis tool, the snapshot data used in analysis, metadata definitions used in the analysis, discovered snapshot repositories, system details, and the like. Additional outputs may be formatted into one or more files. For example, in one instance, the analysis tool may generate three data structure files. One of the files may contain details of the snapshot repositories discovered on the target database system. Another file may include metrics corresponding to the discovered snapshots and snapshot repository instances. A third file may include details of the snapshot instances discovered and may include lists of data fields available. The files may be read as external tables by other database or analysis tools providing access to the data by database reporting and charting tools.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

In one aspect of the embodiment, the analysis tool may comprise a computer program product residing on a non-transitory processor-readable medium. The computer program product may include processor-readable instructions configured to cause a processor to perform analysis on repository of database snapshot information. The computer program product may include processor-readable instructions configured to cause the processor to cause an interface to be presented that displays a user interface enabling a user to select of specify the range or type of analysis, and what data to analyze. The user interface may further be operable to present the results of the analysis to the user.

Figure 6:
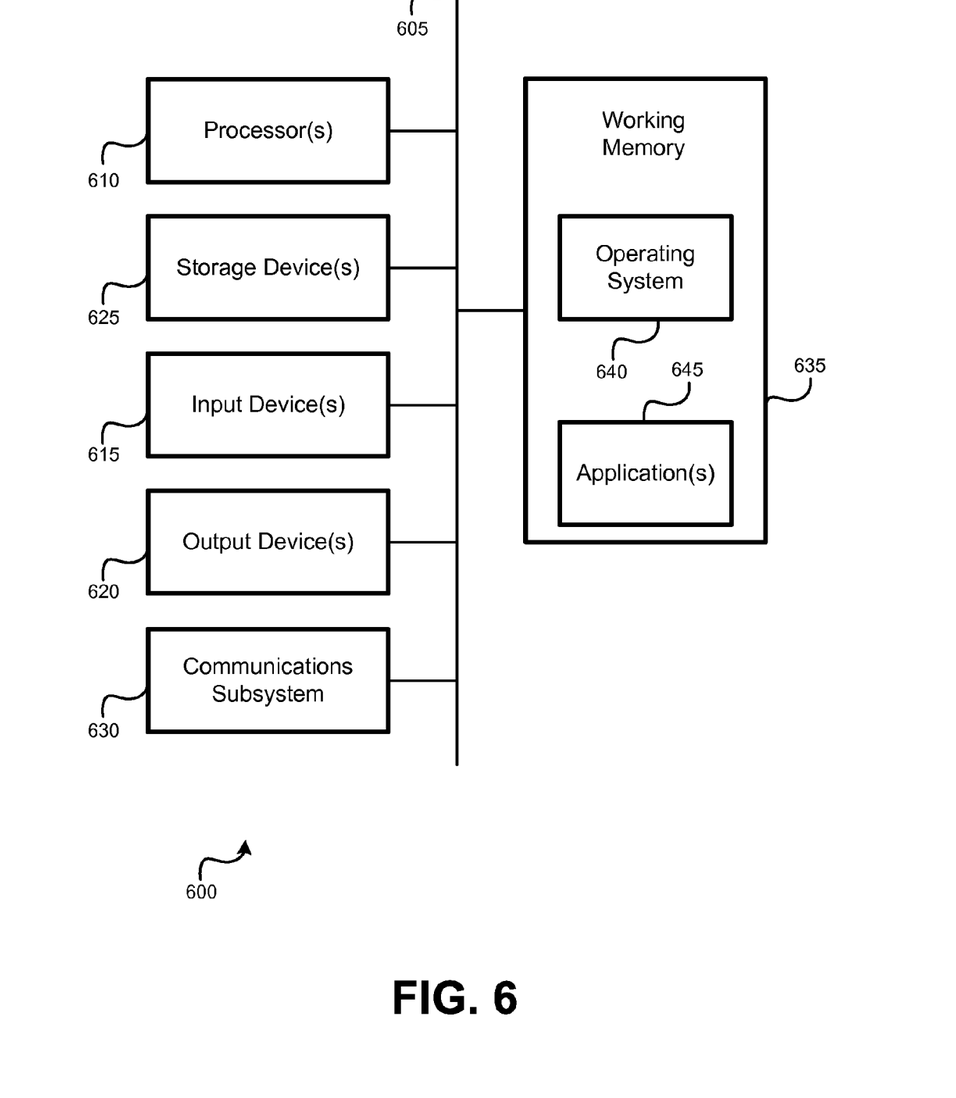
FIG. 6 illustrates an embodiment of a computer system.

FIG. 6 illustrates an embodiment of a computer system. A computer system as illustrated in FIG. 6 may be incorporated as part of the previously described computerized systems, such as system 100 of FIG. 1. Computer system 600 can represent some or all of the components of the computer systems and/or the remote computer systems discussed in this application. Computer system 600 may execute the analysis tool. FIG. 6 provides a schematic illustration of an embodiment of a computer system 600 that can perform the methods provided by various embodiments, as described herein. It should be noted that FIG. 6 is meant only to provide a generalized illustration of various components, any or all of which may be utilized as appropriate. FIG. 6, therefore, broadly illustrates how individual system elements may be implemented in a relatively separated or relatively more integrated manner.

The computer system 600 is shown comprising hardware elements that can be electrically coupled via a bus 605 (or may otherwise be in communication, as appropriate). The hardware elements may include one or more processors 610, including without limitation one or more general-purpose processors and/or one or more special-purpose processors (such as digital signal processing chips, graphics acceleration processors, and/or the like); one or more input devices 615, which can include without limitation a mouse, a keyboard, and/or the like; and one or more output devices 620, which can include without limitation a display device, a printer, and/or the like.

The computer system 600 may further include (and/or be in communication with) one or more non-transitory storage devices 625, which can comprise, without limitation, local and/or network accessible storage, and/or can include, without limitation, a disk drive, a drive array, an optical storage device, a solid-state storage device, such as a random access memory ("RAM"), and/or a read-only memory ("ROM"), which can be programmable, flash-updateable and/or the like. Such storage devices may be configured to implement any appropriate data stores, including without limitation, various file systems, database structures, and/or the like.

The computer system 600 might also include a communications subsystem 630, which can include without limitation a modem, a network card (wireless or wired), an infrared communication device, a wireless communication device, and/or a chipset (such as a Bluetooth™ device, an 802.11 device, a WiFi device, a WiMax device, cellular communication facilities, etc.), and/or the like. The communications subsystem 630 may permit data to be exchanged with a network (such as the network described below, to name one example), other computer systems, and/or any other devices described herein. In many embodiments, the computer system 600 will further comprise a working memory 635, which can include a RAM or ROM device, as described above.

The computer system 600 also can comprise software elements, shown as being currently located within the working memory 635, including an operating system 640, device drivers, executable libraries, and/or other code, such as one or more application programs 645, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be stored on a non-transitory computer-readable storage medium, such as the non-transitory storage device(s) 625 described above. In some cases, the storage medium might be incorporated within a computer system, such as computer system 600. In other embodiments, the storage medium might be separate from a computer system (e.g., a removable medium, such as a compact disc), and/or provided in an installation package, such that the storage medium can be used to program, configure, and/or adapt a general purpose computer with the instructions/code stored thereon. These instructions might take the form of executable code, which is executable by the computer system 600 and/or might take the form of source and/or installable code, which, upon compilation and/or installation on the computer system 600 (e.g., using any of a variety of generally available compilers, installation programs, compression/decompression utilities, etc.), then takes the form of executable code.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer system (such as the computer system 600) to perform methods in accordance with various embodiments of the invention. According to a set of embodiments, some or all of the procedures of such methods are performed by the computer system 600 in response to processors 610 executing one or more sequences of one or more instructions (which might be incorporated into the operating system 640 and/or other code, such as an application program 645) contained in the working memory 635. Such instructions may be read into the working memory 635 from another computer-readable medium, such as one or more of the non-transitory storage device(s) 625. Merely by way of example, execution of the sequences of instructions contained in the working memory 635 might cause the processor(s) 610 to perform one or more procedures of the methods described herein.

The terms "machine-readable medium" and "computer-readable medium," as used herein, refer to any medium that participates in providing data that causes a machine to operate in a specific fashion. In an embodiment implemented using the computer system 600, various computer-readable media might be involved in providing instructions/code to processor (s) 610 for execution and/or might be used to store and/or carry such instructions/code. In many implementations, a computer-readable medium is a physical and/or tangible storage medium. Such a medium may take the form of a non-volatile media or volatile media. Non-volatile media include, for example, optical and/or magnetic disks, such as the non-transitory storage device(s) 625. Volatile media include, without limitation, dynamic memory, such as the working memory 635.

Common forms of physical and/or tangible computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, EPROM, a FLASH-EPROM, any other memory chip or cartridge, or any other medium from which a computer can read instructions and/or code.

Various forms of computer-readable media may be involved in carrying one or more sequences of one or more instructions to the processor(s) 610 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 600.

The communications subsystem 630 (and/or components thereof) generally will receive signals, and the bus 605 then might carry the signals (and/or the data, instructions, etc. carried by the signals) to the working memory 635, from which the processor(s) 610 retrieves and executes the instructions. The instructions received by the working memory 635 may optionally be stored on a non-transitory storage device 625 either before or after execution by the processor(s) 610.

It should further be understood that the components of computer system can be distributed across a network. For example, some processing may be performed in one location using a first processor while other processing may be performed by another processor remote from the first processor. Other components of computer system 600 may be similarly distributed.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered. Accordingly, the above description does not bound the scope of the claims.

What is claimed is:

1. A system for providing statistic data for a database, the system comprising:
   one or more processors;
   a non-transitory computer-readable storage medium storing a plurality of instructions, which, when executed, cause the one or more processors to:
      define a time period of analysis of a snapshot information dataset, the snapshot information dataset comprising data relating to a state of the database at multiple instances of times;
      define a data field of the snapshot information to capture for analysis;
      load a meta-data definition for the data field of the snapshot information dataset;
      collect the data field from the snapshot information dataset using the meta-data definition;
      compute a set of statistics over the time period of analysis for the data field of the snapshot information dataset;
      format the set of statistics; and
      output the set of statistics, wherein no snapshot information used to compute the statistics is directly outputted.

2. The system of claim 1, wherein the meta-data definition comprises information on a location of the data field within the snapshot information dataset.

3. The system of claim 2, wherein the location of data field within the snapshot information dataset is defined with a field number, the field number indicating which non-whitespace sequence of characters of the snapshot information is the at least one data field.

4. The system of claim 1, wherein the meta-data definition is determined from the snapshot information dataset and the data field.

5. The system of claim 1, wherein the meta-data definition comprises security and privacy information with a privacy policy for the data field.

6. The system of claim 5, wherein instructions to format the set of statistics are further configured to cause the one or more processors to strip the set of statistics of private information according to the privacy policy defined in the meta-data definition.

7. The system of claim 6, wherein the set of statistics is normalized to show only trends of the set of statistics.

8. A method for providing statistic data for a database, the method comprising:
   collecting, by a computer system, a snapshot information dataset according to a schedule, wherein the snapshot information comprises relating to a state of the database at the time of the snapshot information collection;
   defining, by the computer system, a time period of analysis of the snapshot information dataset;
   defining, by the computer system, a data field of the snapshot information dataset;
   determining, by the computer system, a meta-data definition, the meta-data definition defining a structure and organization of the snapshot information dataset;
   loading, by the computer system, the meta-data definition;
   collecting, by the computer system, the data field from the snapshot information dataset;
   computing, by the computer system, a set of statistics over the time period of analysis for the collected data field; and
   formatting, by the computer system, the set of statistics.

9. The method of claim 8, wherein the meta-data definition comprises information on a location of the data field within the snapshot information dataset.

10. The method of claim 8, wherein the meta-data definition is determined from the snapshot information dataset structure and the data field of the snapshot information dataset.

11. The method of claim 8, wherein the meta-data definition includes snapshot information security and privacy information defining a privacy policy for each data field.

12. The method of claim 11, wherein formatting the set of statistics further comprises stripping the set of statistics of private information according to the privacy policy defined in the meta-data definition.

13. The method of claim 12, further comprising the step of normalizing the set of statistics.

14. The method of claim 12, further comprising the step of stripping time related information from the set of statistics.

15. A computer program product residing on a non-transitory processor-readable medium and comprising processor readable instructions configured to cause one or more processors to:
   collect a snapshot information dataset according to a schedule, the snapshot information dataset comprising data relating to a state of a database at the time of the snapshot information dataset collection;
   define a time period of analysis of the snapshot information dataset;
   define a data field of the snapshot information dataset to capture for analysis;
   determine a meta-data definition, the meta-data definition defining a structure and organization of the snapshot information dataset and the data field;
   load the meta-data definition;
   collect the data field from the snapshot information;
   compute a set of statistics over the time period of analysis for the data field;
   format the set of statistics; and
   output the set of statistics, wherein no snapshot information used to compute the statistics is directly outputted.

16. The computer program of claim 15, wherein the meta-data definition comprises information on a location of the data field within the snapshot information dataset.

17. The computer program of claim 15, wherein the meta-data definition is determined from the snapshot information dataset structure and the data field of the snapshot information dataset.

18. The computer program of claim 15, wherein the meta-data definition includes security and privacy information defining a privacy policy for the data.

19. The computer program of claim 18, wherein the set of statistics are formatted to strip private information according to the privacy policy defined in the meta-data definition.

20. The computer program of claim 19, further comprising instructions to cause the one or more processors to normalize the set of statistics.

* * * * *